J. E. C. JACOBSEN & C. A. V. J. SEGERSTEN.
GATE OPERATING MECHANISM.
APPLICATION FILED AUG. 30, 1911.
1,087,770.
Patented Feb. 17, 1914.
6 SHEETS—SHEET 1.
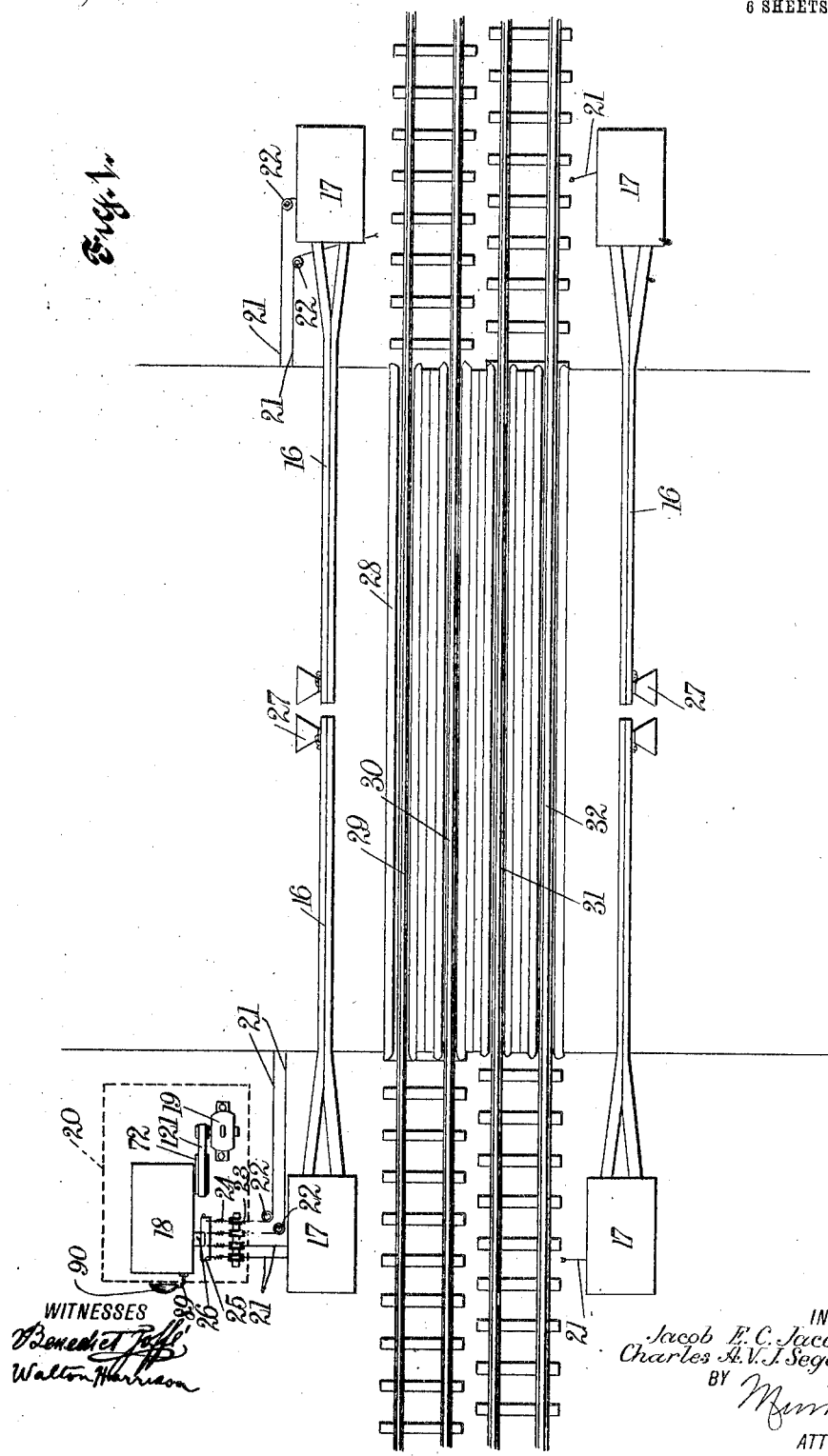
INVENTORS
Jacob E. C. Jacobsen
Charles A. V. J. Segersten
BY Munn & Co.
ATTORNEYS

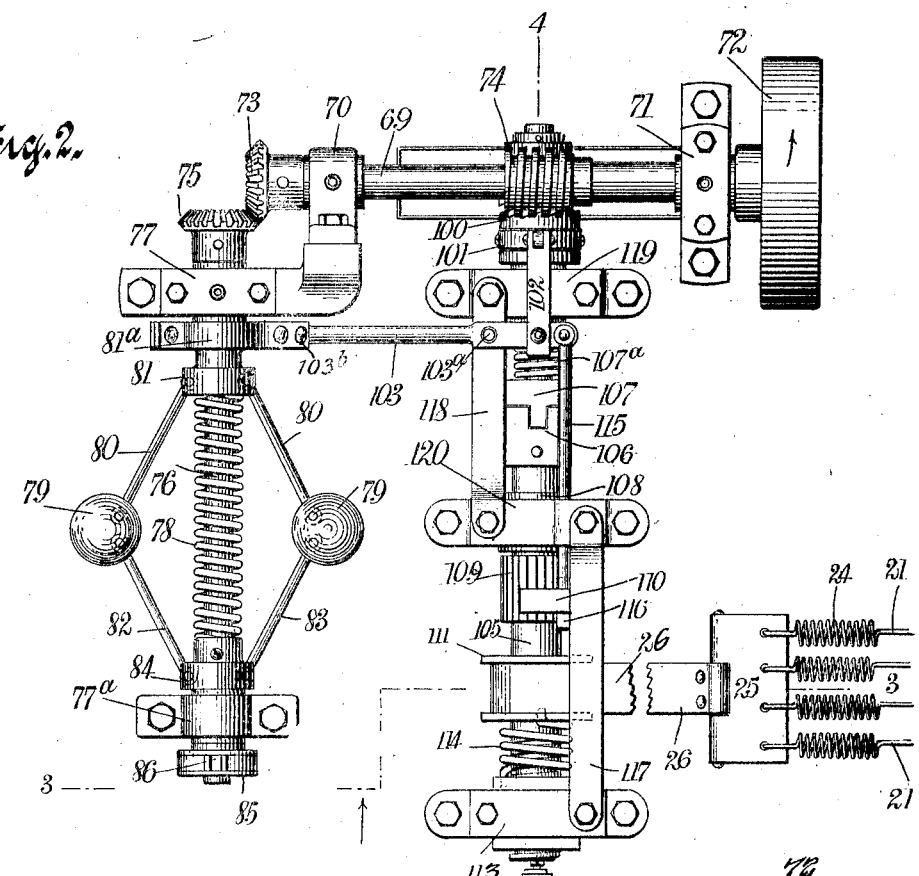

J. E. C. JACOBSEN & C. A. V. J. SEGERSTEN.
GATE OPERATING MECHANISM.
APPLICATION FILED AUG. 30, 1911.
1,087,770.
Patented Feb. 17, 1914.
6 SHEETS—SHEET 3.
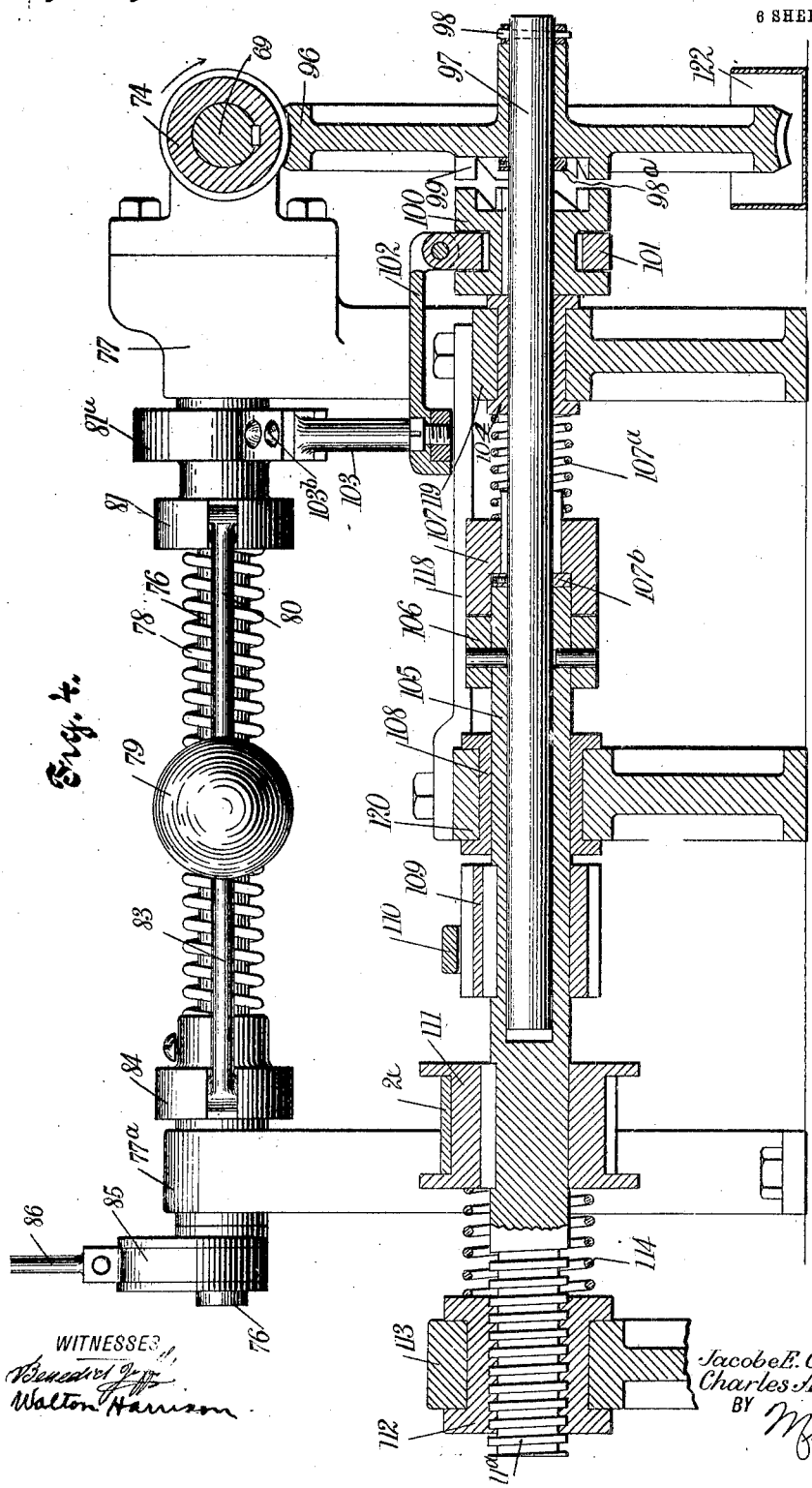
INVENTORS
Jacob E. C. Jacobsen
Charles A. V. J. Segersten
BY
ATTORNEYS
WITNESSES J. E. C. JACOBSEN & C. A. V. J. SEGERSTEN.
GATE OPERATING MECHANISM.
APPLICATION FILED AUG. 30, 1911.
1,087,770. Patented Feb. 17, 1914.
6 SHEETS—SHEET 4.
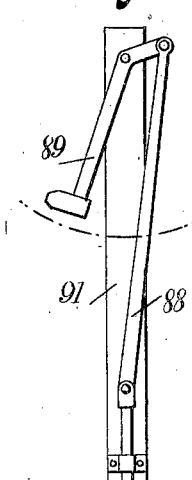
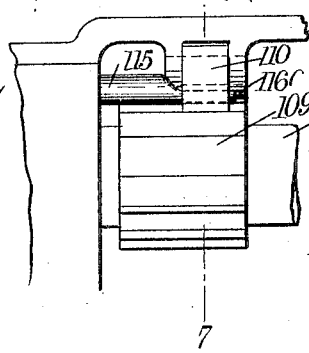
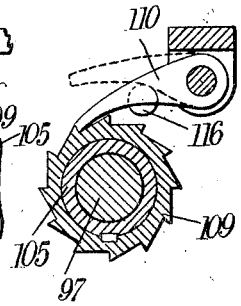
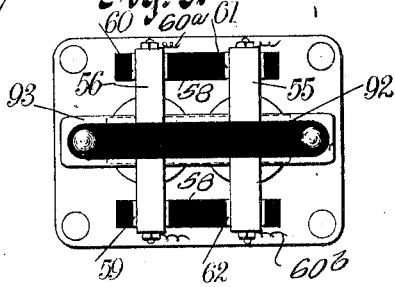
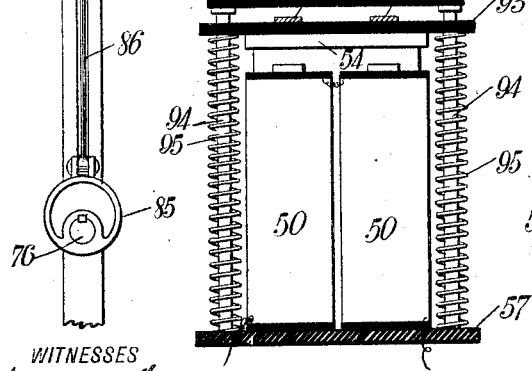
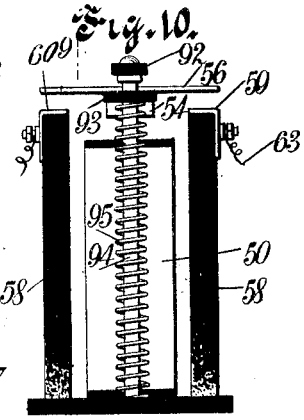
WITNESSES
INVENTORS
Jacob E. C. Jacobsen
Charles A. V. J. Segersten
BY
ATTORNEYS

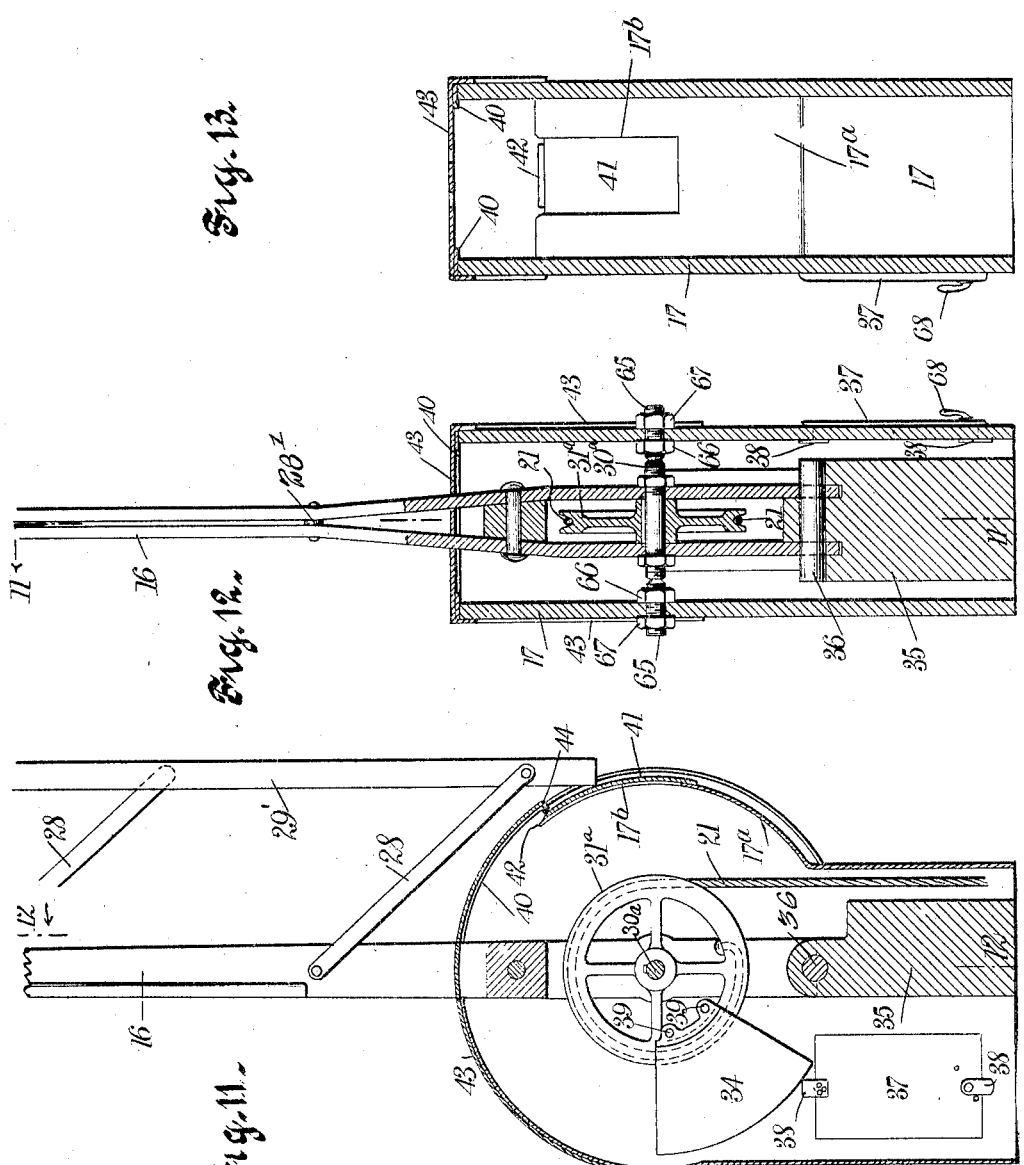

J. E. C. JACOBSEN & C. A. V. J. SEGERSTEN.
GATE OPERATING MECHANISM.
APPLICATION FILED AUG. 30, 1911.
1,087,770.
Patented Feb. 17, 1914.
6 SHEETS—SHEET 6.
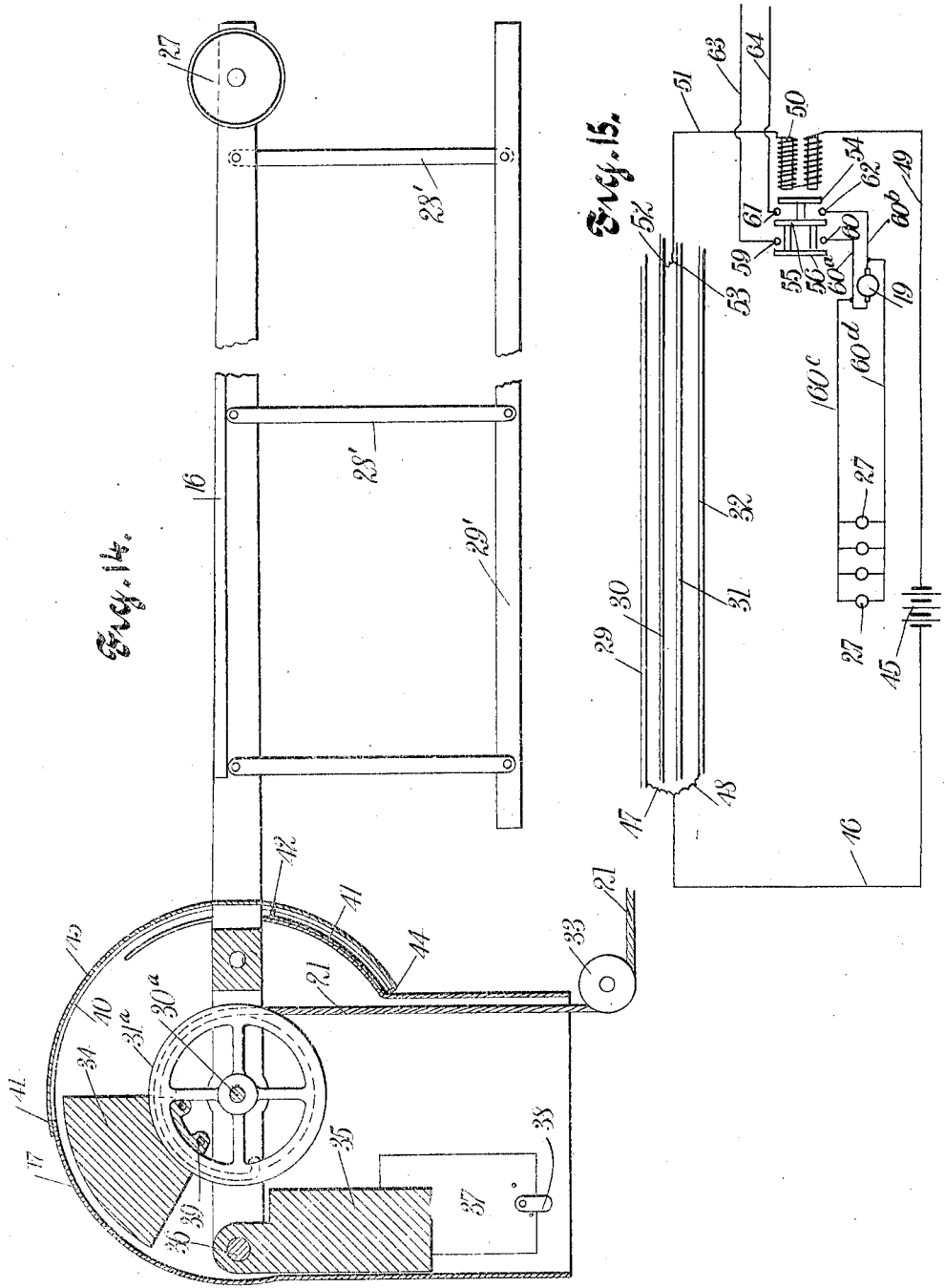
WITNESSES
INVENTORS
Jacob E. C. Jacobsen
Charles A. V. J. Segersten
BY
ATTORNEYS

UNITED STATES PATENT OFFICE.

JACOB E. C. JACOBSEN AND CHARLES A. V. J. SEGERSTEN, OF NYACK, NEW YORK.

GATE-OPERATING MECHANISM.

1,087,770.   Specification of Letters Patent.   Patented Feb. 17, 1914.

Application filed August 30, 1911. Serial No. 646,799.

*To all whom it may concern:*

Be it known that we, JACOB E. C. JACOBSEN and CHARLES A. V. J. SEGERSTEN, both citizens of the United States, and residents of Nyack, in the county of Rockland and State of New York, have invented a new and Improved Gate-Operating Mechanism, of which the following is a full, clear, and exact description.

Our invention relates to gate-operating mechanism and is intended more particularly for railway use at crossings, street intersections and upon bridges and the like.

More particularly stated, our invention comprehends mechanism whereby a train in approaching a predetermined part of a track provided with gates, will cause the gates to close automatically, will actuate lamps serving as alarms, and will retain the gates closed and the alarm active so long as the train is present, but when the train departs on its journey, the gates are automatically opened and the alarm rendered inactive.

Reference is to be had to the accompanying drawings, forming a part of this specification, in which similar characters of reference indicate corresponding parts in all the figures, and in which—

Figure 1 is a plan view, partly diagrammatic, showing in a general way, the arrangement of the gate-operating mechanism; Fig. 2 is a detail showing in plan, part of the gearing used more particularly for raising and lowering the gates; Fig. 3 is a section on the line 3—3 of Fig. 2 looking in the direction of the arrow; Fig. 4 is a section on the line 4—4 of Fig. 2 looking in the direction of the arrow; Fig. 5 is a detail showing how part of the alarm mechanism is actuated; Fig. 6 is a detail showing a ratchet used for holding a part of the gate-operating mechanism temporarily in a predetermined position; Fig. 7 is a section on the line 7—7 of Fig. 6 looking in the direction of the arrow; Fig. 8 is a plan view of a relay forming a part of our mechanism; Fig. 9 is a vertical section taken on the line 9—9 of Fig. 10 looking in the direction of the arrow and showing the construction of this relay; Fig. 10 is a side elevation of the relay; Fig. 11 is a vertical section through one of the gate casings and is taken on the line 11—11 of Fig. 12; Fig. 12 is a vertical section on the line 12—12 of Fig. 11 looking the direction of the arrow; Fig. 13 is a section through the gate casing, the movable parts having been removed; Fig. 14 is a view partly in elevation and partly in section showing more particularly a gate and gate casing; and Fig. 15 is a diagram of the electrical connections.

Each gate 16 is mounted upon and supported by a casing 17, which contains various operative parts as hereinafter described. The gate-controlling mechanism is for the most part located within a casing 18 and is distinct from the gate-operating mechanism. An electric motor 19 is used for actuating the gate-controlling mechanism and indirectly for driving the gate-operating mechanism. A housing 20 may, if desired, be used for the purpose of inclosing various movable parts, as indicated in the upper left-hand corner of Fig. 1. Incidental to actuating the gates, we employ flexible cables 21, supporting the same wherever desirable, by pulleys 22. The cables 21 engage a number of pulleys 23 and-connected with the cables are spiral springs 24 severally connected with the cross bar 25. Secured to this cross bar is a strap 26 of spring metal, leather or other appropriate material for pulling the bar sidewise in order to move the cords 21. The springs 24 are for the purpose of cushioning this movement, and for equalizing, in a measure, the strains upon the cables 21. The gates 16 are severally provided at their outer ends, with electric lamps 27. A crossing is shown at 28, and at 29, 30, 31, 32 are shown the rails of a double railway track.

Each gate 16 is provided with a number of pendant rods 28′ and pivotally connected with the latter is a bar 29′ of considerable length. When the gate swings downward or is closed (see Fig. 14), the bar 29 by hanging as shown, makes the gate practically a little wider or rather a little deeper than would otherwise be the case. Extending through the gate for the purpose of supporting the same, is a shaft 30ª and rigidly mounted upon the latter is a pulley 31ª. The shaft 30ª (see Fig. 12) is supported upon conical pointed bolts 65, which are secured upon the casing by aid of nuts 66, 67. A handle 68 is provided with the door 37, to enable the operator to remove the latter readily. A cord 21 is wound partially around the pulley 31ª and secured directly thereto, this cord also engaging a pulley 33. A counterweight 34 having generally the form of a sector, is by aid of fastenings 39, adjustably mounted upon the pulley 31ª. By loosening the fastenings 39, the counterweight 34 may be moved into different positions relatively to the pulley 31ª and then tightened securely in position. Another counterweight 35 is by aid of a pivot pin 36, mounted upon the gate casing. The weight of these two counterweights is sufficient to open the gate,—that is, to restore it to its normal position after each time it is closed or lowered.

A door 37 is detachably connected with the casing 17 and is provided with fastenings 38 for normally holding it in position. Each casing 17 is provided with an opening 40 of arcuate form, this opening being located in the upper portion of the casing which is rounded as will be understood from Fig. 14. A door 41 having generally an arcuate form, is fitted upon this rounded portion and is provided with a flange 42 extending radially outward. This door 41 engages the convex outer surface of a portion 17ª of the casing when it is in open position, as shown in Fig. 14, and moves along guides 17ᵇ, which engage the vertical edges thereof when the door 41 is moved away from the portion 17ª of the casing, these guides 17ᵇ merely forming extensions of the vertical edges of the portion 17ª. Another door 43, also, of arcuate form but larger in one direction than the door 41, is provided at its lower end with a flange 44 bent inward and adapted to engage the flange 42. The door 43 is mounted directly upon the gate 16 and carried thereby. When the gate 16 moves upward it causes the door 43 to turn upon the same center of rotation as the gate, but when the flange 44 engages the flange 42, the door 41 is lifted and travels with the door 43. The two doors 41, 43 together keep the opening 40 closed. The purpose of this arrangement is to exclude rain, snow, dust and dirt from the casing and mechanism contained therein, yet allowing full freedom of movement for the gate.

A battery 45 is shown in Fig. 15, and connected to this battery is a wire 46, this wire being connected to two other wires 47, 48. The wire 47 is secured to the rail 29 and the wire 48 is similarly connected to the rail 32. A wire 49 is connected with the battery 45 and with a relay magnet 50. A wire 51 is connected with this magnet and leads to wires 52, 53, the wire 52 being connected with the rail 30 and the wire 53 leading to the rail 31.

The structure of the relay will be understood more particularly by reference to Figs. 8, 9 and 10. An armature is shown at 54 and contact bars 55, 56 are movable by aid of this armature. The relay magnet is supported upon a base 57 of insulating material.

Mounted upon posts 58, are four contact members 59, 60, 61 and 62. Connected with the contact members 59, 61, which are stationary, are two wires 63, 64, and connected with the contact members 60, 62, are wires 60ª, 60ᵇ, which lead to the motor 19. Connected with the wires 60ª, 60ᵇ, are two other wires 60ᶜ, 60ᵈ, which lead to the respective lamps 27, the latter being parallel with each other, as will be understood from Fig. 15.

The relay shown in Figs. 8, 9 and 10, is provided with a bar 92 of insulating material, this bar being mounted rigidly upon two rods 94, the latter being secured rigidly upon the base 57. Another bar 93 of insulating material is slidably mounted relative to the rods 94. Spiral springs 95 encircle the rods 94 and engage both the base 57 and the bar 93. Whenever the magnets 50 are energized, they attract the armature 54, which carries with it the bar 93 and contact tongues 55, 56, so that these tongues are brought into engagement with the stationary contact members with which they are associated.

The gate-controlling mechanism contained within the casing 18 (see Fig. 1) is shown more particularly in Figs. 2, 3 and 4. A horizontal shaft 69 is mounted in bearings 70, 71, and is provided with a fixed pulley 72, whereby it may be rotated. The shaft 69 is further provided with a bevel gear 73 secured rigidly upon it. Mounted fixedly upon the approximate middle portion of the shaft 69 is a worm 74. Meshing with the bevel gear 73 is another bevel gear 75, which is mounted rigidly upon a revoluble shaft 76. This shaft is supported in bearings 77, 77ª, and is encircled by a spiral spring 78. Two weights 79 having generally a spherical form, are mounted upon rods 80, 82, 83, the rods 80 being journaled to a collar 81; the rods 82, 83 being journaled to a collar 84. The collar 84 is fixed upon the shaft 76 but the collar 81 is loose upon said shaft. An eccentric 85 is mounted upon the shaft 76 and connected with this eccentric is a rod 86 which extends upwardly as will be understood from Fig. 5. Pivotally connected with the rod 86 is another rod 87, the latter at its top being pivotally connected to a pitman 88, and connected with this pitman is a hammer 89. Adjacent to this hammer is a gong 90 (see upper left-hand corner of Fig. 1), which is repeatedly struck by the hammer whenever the eccentric 85 is operated by the rotation of the shaft 76. A post 91 (see Fig. 5) is conveniently used for supporting the various rods 86, 87, 88, gong 90 and hammer 89.

The worm 74 meshes with a worm wheel 96 (see Fig. 4), which is mounted loosely upon a shaft 97 and normally turns upon this shaft without rotating the latter. A cotter pin 98 extends through the shaft 97 adjacent one end thereof and prevents the worm wheel from moving to the right according to Fig. 4. A set collar 98ª secured rigidly upon the shaft 97 prevents the worm wheel 96 from moving to the left according to the figure last mentioned. The worm wheel 96 is provided with a clutch member 99. Mating this clutch member is another clutch member 100, which is splined upon the shaft 97, so as to have a sliding movement relatively to said shaft while partaking of its rotation. Encircling the clutch member 100 and loose relative thereto, is a collar 101, and pivotally connected with this collar is an arm 102, said arm being also pivotally connected to a lever 103, the form of which will be readily understood from Figs. 2 and 4. The lever 103 is journaled upon a fixed pivot 103ª, said lever being also connected by a pivot 103ᵇ to a bearing 81ª encircling the collar 81. The arrangement of parts is such that when the collar 81 and bearing 81ª are drawn away from the bearing 77, the lever 103 is rocked upon its pivot 103ª, so that the arm 102 presses the clutch member 100 into engagement with the clutch member 99, thus securely locking the wheel 96 upon the shaft 97. The shaft 97 extends through a stationary bearing 104, and a tubular shaft 105 supports a portion of the shaft 97. The tubular shaft 105 is provided with a clutch member 106 secured rigidly thereupon, and another clutch member 107 is splined upon the shaft 97. A spring 107ª engages the clutch member last mentioned, and also engages the bearing 104, so as to normally press the clutch member 107 to the left according to Fig. 4. A set collar 107ᵇ limits the axial travel of the clutch member 107. A bearing 108 encircles the tubular shaft 105 and supports the same. A ratchet wheel 109 is keyed firmly upon the tubular shaft 105 and is revoluble therewith. A pawl 110 is located above this ratchet and is adapted to engage the same. A spool 111 is keyed upon the tubular shaft 105 and consequently is revoluble therewith.

A fixed nut 112 is mounted upon a pedestal 113. The tubular shaft 105 is provided with a solid threaded portion 111ª which extends through the nut 112, these parts being so arranged that when the tubular shaft 105 is turned, it has a progressive axial movement relatively to the pedestal 113 and other stationary parts. A spiral spring 114 encircles the threaded portion 111ª of the tubular shaft 105. This spring, at one of its ends, engages the bearing 112, and at its other end is connected with the spool 111.

A rod 115 is pivotally connected at one of its ends, to one end of the lever 103, said rod being provided with a cam surface 116, so that as it is moved in the general direction of its length it raises or lowers the pawl 110, as indicated by full and dotted lines in Fig. 7; that is to say, as the lever 103 under centrifugal action of the governor, swings upon the pivot 103ª, the rod 115 is moved endwise in such direction as to lower the pawl 110, and when the centrifugal action of the governor has ceased so that the lever 103 resumes its normal position, the rod 115 moves endwise so that its cam surface 116 raises the pawl 110, the latter then resting above the ratchet 109. A brace 117 extends from the pedestal 113 to another pedestal 120, and from the latter a brace 118 extends to a third pedestal 119, the pedestals being employed to support various movable parts above described. An oil trough is shown at 122, the worm wheel 96 extending down into said oil trough and being lubricated by aid thereof.

The result of the above arrangement is that when the governor is idle or has only a slight motion, the pawl 110 is out of engagement with the ratchet 109, but when the governor is in rapid motion, the pawl engages the ratchet.

The operation of our device is as follows: We will suppose that at the start the various movable parts occupy their respective normal positions, the gates are open and the electric mechanism is idle. If now a train comes along it short-circuits either the two rails 29, 30, or the two rails 31, 32, as the case may be, the rails 29, 30, 31 and 32 being insulated rail sections, as required. Supposing that the rails 29, 30 are the ones affected, the following circuit is completed: battery 45, wire 49, relay magnet 50, wires 51, 52, rail 30, approaching train, rail 29, wires 47, 46, to battery 45. This energizes the relay magnet 50 and causes it to attract its armature 54. The contact tongues 55, 56 are now brought into engagement with the respective contact members 59, 60, 61, 62 with which they are associated. The following circuits are thus completed: a source of electricity (not shown) connected with the wire 63, stationary contact member 59, contact tongue 56, stationary contact member 60, wire 60ª, lamps 27 (in parallel), wire 60ᵈ, wire 60ᵇ, stationary contact member 62, contact tongue 55, stationary contact member 61, wire 64, back to source of electricity. This lights the lamps 27. Another circuit to some extent common to the one preceding, is also completed as follows: source of electricity, wire 63, stationary contact member 59, contact tongue 56, stationary contact member 60, wire 60ª, electric motor 19, wire 60ᵇ, stationary contact member 62, contact tongue 55, stationary contact member 61, wire 64, back to source of electricity. This current starts the electric motor 19 into action. This motor by aid of the belt 121 turns the pulley 72; the rotation of said pulley beginning practically as soon as the lamps 27 are lighted. The rotation of the pulley 72 turns the shaft 69, worm 74 and the bevel gear 73. The rotation of this bevel gear causes the bevel gear 75 and shaft 76 to operate the governor.

When the current is first turned on, as just described, the rotary motion communicated to the shaft 69 and parts carried thereby is quite slight. The load now upon the shaft 69 is comparatively light, owing to the fact that the worm wheel 96 (see Fig. 4) is loose relatively to the shaft 97 and is not turning the latter. The increasing speed of the governor, however, soon causes the weights 79 to move apart under centrifugal action, so that the strap 81ª is drawn to the left according to Fig. 4. This rocks the lever 103 upon the pivot pin 103ª and causes the arm 102 to force the clutch member 100 to the right according to Fig. 4. This brings the clutch member 100 into engagement with the clutch member 99, and, therefore the rotation of the worm wheel 96 causes the shaft 97 to turn. Our purpose in so arranging the mechanism that the worm wheel 96 begins to turn rapidly before communicating any motion to the shaft 97, is to enable the electric motor 19 before assuming the work of operating the gates, to first acquire a good speed. The worm wheel 96 continues to turn the shaft 97 and as the clutch members 106, 107 are now in engagement, the threaded portion 111ª of the tubular shaft 105 is also turned, and because of this fact is advanced axially in reference to the nut 112 in which it works. Hence the tubular shaft 105 is gradually fed to the left according to Fig. 4. This action is continued until the clutch member 106 is thrown out of engagement with the clutch member 107, which is unable to follow it on account of the set collar 107ᵇ. The rotation of the tubular shaft 105 winds the spring 114 and also turns the spool 111. The rotation of the spool winds up the strap 26 and pulls the bar 25, so as to stretch the springs 24 and draw the cords 21. As each cord 21 controls a pulley 31 (see Fig. 11), the drawing of all of the cords turns the respective pulleys 31ª so as to lower or close the gates 16. In doing this, the doors 41, 43 of arcuate form associated with the casings 17, operate as above described and keep these casings closed. The turning of the pulley 31ª raises the counterweights 34, 35 which are heavy enough to restore the gates to normal position as above explained.

As the governor rotates at its maximum speed, the rod 115 under control of the lever 103, is moved relatively to the pawl 110, so that the cam surface 116 is shifted and the pawl 110 is thus lowered into engagement with the ratchet 109. This occurs just before the clutch member 106 is disengaged from the clutch member 107. When, therefore, the disengagement of these clutch members takes place, the shaft 105 is prevented from rotating backward, it being unable to do so because the pawl 110 holds the ratchet 109. This leaves the gates and their immediate connections closed and for a time idle. The shaft 97, however, continues to rotate and to operate the governor at the maximum speed of the latter. This state of affairs will continue so long as the train is present.

Suppose now, that the train takes its departure, the circuit above traced through the relay magnets 50 is thus broken, because the train no longer connects together the rails 29, 30, forming a part of said circuit. The contact tongues 55, 56 are disengaged from the stationary contact members associated with them. The circuit through the lamps is thus broken and the lights are consequently extinguished. The electric motor 19 is deënergized because the circuit through it is broken, consequently the governor and the shafts 96, 97 become idle. As the governor stops running, its spring 78 forces the collar 81 to the right according to Fig. 4. The lever 103 is thus rocked upon its pivot 103ª. The arm 102 pulls the clutch member 100 out of engagement with the clutch member 99, and in so doing, leaves these two clutch members in their respective normal positions as indicated in Fig. 4. This, however, is not all that occurs. The movement of the lever 103 into its normal position as just described, causes the rod 115 to move endwise relatively to the cam 110. The cam surface 116 thus lifts the pawl 110 out of engagement with the ratchet 109, and as a consequence, the tubular shaft 105 is no longer restrained. The spring 114 having been wound as above described, now unwinds and in so doing, causes the rotation of the spool 111. This unwinds the strap 26, and relaxes the tension upon the flexible cables 21. The counterweights 34, 37 (see Fig. 11) being heavier than the gate 16, are carried downward by gravity so that the gates are raised. All movable parts now occupy their respective normal positions as described at the beginning of the operation.

We do not limit ourselves to the particular form of mechanism here shown and described, as various changes may be made therein without departing from the spirit of our invention.

Having now described our invention what we claim as new and desire to secure by Letters Patent is:—

1. In a gate operating mechanism, the combination of a revoluble shaft, a governor in operative relation therewith, a second revoluble shaft, means controllable in part by centrifugal action of said governor and in part by rotation of said second-mentioned shaft for connecting said first-mentioned shaft to said second-mentioned shaft and disconnecting the same therefrom, and means controllable by said second-mentioned shaft for lowering a gate.

2. In a gate operating mechanism, the combination of a revoluble shaft, a governor in operative relation therewith, a second revoluble shaft, means for normally locking said shafts together so that they may turn as a unit, mechanism connected with said second-mentioned shaft and driven thereby for the purpose of actuating a gate, means for restoring said gate to its normal position, and mechanism connected with said governor and controllable thereby for temporarily rendering inactive said last-mentioned means.

3. In a gate operating mechanism, the combination of a revoluble shaft, means controllable by the presence of a train for turning said revoluble shaft, a second revoluble shaft, clutch mechanism connecting said first-mentioned shaft and said second-mentioned shaft together, means controllable by said second-mentioned shaft for moving a gate in one direction, centrifugally operated governor mechanism in operative relation to said first-mentioned shaft and driven thereby, and means controllable by said centrifugally operated governor mechanism for temporarily holding said second-mentioned shaft in a predetermined definite position.

4. In a gate operating mechanism, the combination of a revoluble shaft, means controllable by the presence of a train for turning the same, a second revoluble shaft, clutch mechanism for holding said first-mentioned shaft and said second-mentioned shaft together so as to enable said second-mentioned shaft to be driven by said first-mentioned shaft, mechanism connected with said second-mentioned shaft for closing a gate, mechanism including a pawl for temporarily restraining said last-mentioned mechanism, and centrifugally operated mechanism connected to said first-mentioned shaft and provided with means for shifting the position of said pawl.

5. In a gate operating mechanism, the combination of a gate, pivotal mounting means therefor, an operating shaft, another shaft, clutch means for connecting said shafts together, flexible means connecting the other shaft to the gate, and means automatically operated by the other shaft to throw said clutch means out of connecting position after the other shaft has been turned to actuate the gate.

6. In a gate operating mechanism, the combination of a revoluble shaft, means for operating said shaft, another shaft, means for connecting said shafts together, means connecting said other shaft to said gate, means actuated by said other shaft after the gate has been actuated to move the means for connecting said shafts out of engaged relation, and means engaging said other shaft to prevent the gate from returning to its original position.

7. In a gate operating mechanism, the combination of a revoluble shaft, another shaft, means for connecting said shafts together, means for connecting the said other shaft to the gate to lower the same, means operated by the movement of said other shaft to move the means for connecting said shafts out of connecting position when the gate has been actuated, and means for engaging and holding said other shaft after the gate has been actuated, to prevent the gate from returning.

8. In a gate actuating mechanism, the combination of a gate, pivotal mounting means for the same, said gate having counterweights to hold the same in open position, an operating shaft, another shaft, means for connecting said shafts together, means for connecting the said other shaft to the gate to lower the same, means operated by the other shaft after the gate has been lowered to move the means connecting the said shafts to disengaged position, and means for engaging said other shaft after the gate has been lowered to prevent the counterweights from raising the same.

9. In a gate operating mechanism, the combination of a gate, means for pivotally mounting the same, an operating shaft, another shaft, means for detachably connecting said shafts together, means for connecting said other shaft to the gate to actuate the same, a screw-threaded bearing for said other shaft, said other shaft having screw threads thereon to engage said bearing, whereby the said shaft will be moved out of engagement with the operating shaft after the same has been turned to a certain extent, and means for engaging said other shaft to prevent the gate from returning to its original position.

10. In a gate operating mechanism, the combination of a gate, pivotal mounting means therefor, an operating shaft, another shaft, means for detachably connecting said shafts, means for connecting said other shaft to the gate to actuate the same, means for automatically moving said other shaft out of engagement with the first shaft after the gate has been actuated, and means for subsequently causing said shafts to return to connecting position.

11. In a gate operating mechanism, the combination of a gate, pivotal mounting means for the same, an operating shaft, another shaft, means for detachably connecting said shafts together, means carried by the other shaft for engaging the gate and actuating the same, means actuated by the shaft for disengaging the same from the first shaft after the same has been actuated, and resilient means in position to be stressed by the movement of the shaft for returning said shafts to engaging position.

12. In a gate operating mechanism, the combination of a gate, means for pivotally mounting the same, an operating shaft, means detachably engaging said shaft and connected to said gate for actuating the gate, means controlled by said actuating means for disconnecting said actuating means from the operating shaft, and means for holding said gate in position after the same has been actuated.

13. In a gate operating mechanism, the combination of a gate, means for pivotally mounting the same, operating means, means for actuating said gate, means for connecting said actuating means to the operating means, means controllable by the actuating means for disconnecting the actuating means from the operating means after the gate has been actuated, means for engaging the actuating means to prevent the return of the gate, and means controllable by the operating means for allowing said means for preventing the return of the gate to come into engaging position with respect to the actuating means.

14. In a gate operating mechanism, the combination of a gate, pivotal mounting means therefor, operating means, actuating means detachably engaging the operating means for moving said gate, means engaged by the actuating means for moving the actuating means out of engagement with the operating means when the gate has been moved, a pawl for engaging the actuating means to prevent the return of the gate, and a centrifugal governor controlled by the operating means for releasing the pawl and allowing the same to move into engaging position.

15. In a gate-operating mechanism, the combination of a revoluble shaft, a gate, means for connecting the said gate to the shaft, means for operating the shaft to actuate the gate, means carried by the shaft and the operating means for connecting said parts together, the said shaft having a screw-threaded portion, and a bearing having corresponding threads to receive the said screw-threaded portion, whereby when the shaft has been turned a predetermined amount it will be disconnected from the operating means.

16. In a gate-operating mechanism, the combination of a gate, means for actuating said gate, means for engaging the actuating means to lock the same after the gate has been actuated, and automatically-actuated means for controlling the locking means.

17. In a gate-operating mechanism, the combination of a gate, means for actuating the gate, a ratchet carried by said actuating means, a pawl for engaging the ratchet after the gate has been actuated, and automatic means for controlling the pawl to enable the locking means to be locked and unlocked.

In testimony whereof we have signed our names to this specification in the presence of two subscribing witnesses.

JACOB E. C. JACOBSEN.
CHARLES A. V. J. SEGERSTEN.

Witnesses:
  W. H. FISHER,
  W. ZIMMERMANN.